United States Patent
Kim et al.

(10) Patent No.: US 7,436,888 B2
(45) Date of Patent: Oct. 14, 2008

(54) METHOD AND APPARATUS FOR REDUNDANT IMAGE ENCODING AND DECODING

(75) Inventors: Woo-shik Kim, Kyungki-do (KR); Shi-hwa Lee, Seoul (KR); Sang-jo Lee, Kyungki-do (KR)

(73) Assignee: Samsung Electronics Co., Ltd., Suwon, Kyungki-Do (KR)

( * ) Notice: Subject to any disclaimer, the term of this patent is extended or adjusted under 35 U.S.C. 154(b) by 809 days.

(21) Appl. No.: 10/656,186

(22) Filed: Sep. 8, 2003

(65) Prior Publication Data

US 2004/0151244 A1 Aug. 5, 2004

(30) Foreign Application Priority Data

Jan. 30, 2003 (KR) .................. 10-2003-0006287

(51) Int. Cl.
H04N 7/12 (2006.01)
(52) U.S. Cl. .............. 375/240.03; 375/240; 375/240.01; 375/240.12
(58) Field of Classification Search .............. 375/240, 375/240.01, 240.02, 240.03, 240.05, 240.12, 375/240.25
See application file for complete search history.

(56) References Cited

U.S. PATENT DOCUMENTS 5,949,490 A * 9/1999 Borgwardt et al. ..... 375/240.05
6,263,023 B1 * 7/2001 Ngai ..................... 375/240.12
2002/0122481 A1 * 9/2002 Mine ..................... 375/240.01

FOREIGN PATENT DOCUMENTS

JP 11220732 8/1999

OTHER PUBLICATIONS

*Korean Office Action dated May 27, 2005 and English Translation.

* cited by examiner

*Primary Examiner*—Allen Wong
(74) *Attorney, Agent, or Firm*—Buchanan Ingersoll & Rooney PC (57) ABSTRACT

A method and apparatus for redundant image encoding and decoding, in which using a slice structure used for image encoding part of an image is redundantly encoded and decoded are provided. The apparatus for redundant image encoding includes a slice modeling unit which determines the structures of slices to be used in encoding the image and regions to be redundantly encoded so that image data of a predetermined region of the image to be redundantly encoded is contained in a plurality of slices, a slice allocation unit which allocates image data of each region of an image to the plurality of slices, a picture header encoding unit which encodes information required to decode the plurality of encoded slices and generates picture information, and a slice encoding unit which encodes the image in units of slices according to the picture header information.

48 Claims, 9 Drawing Sheets

| 0 | 1 | 2 | 3 | 0 | 1 | 2 |
|---|---|---|---|---|---|---|
| 3 | 0 | 1 | 2 | 3 | 0 | 1 |
| 2 | 3 | 0 | 1 | 2 | 3 | 0 |
| 1 | 2 | 3 | 0 | 1 | 2 | 3 |
| 0 | 1 | 2 | 3 | 0 | 1 | 2 |

FIG. 6B

| 0 | 1 | 2 | 3 | 0 | 1 | 2 |
|---|---|---|---|---|---|---|
| 3 | 0 | 1,0 | 2,1 | 3,2 | 0 | 1 |
| 2 | 3 | 0,3 | 1,2 | 2,3 | 3 | 0 |
| 1 | 2 | 3,0 | 0,1 | 1,3 | 2 | 3 |
| 0 | 1 | 2 | 3 | 0 | 1 | 2 |

FIG. 6C

| 0 | 1 | 2 | 3 | 0 | 1 | 2 |
|---|---|---|---|---|---|---|
| 3 | 0 | 1,4 | 2,4 | 3,4 | 0 | 1 |
| 2 | 3 | 0,4 | 1,4 | 2,4 | 3 | 0 |
| 1 | 2 | 3,4 | 0,4 | 1,4 | 2 | 3 |
| 0 | 1 | 2 | 3 | 0 | 1 | 2 |

FIG. 7A

| 0 | 1 | 2 | 3,1 | 0 | 1 | 2 |
|---|---|---|---|---|---|---|
| 3 | 0,1 | 1 | 2 | 3 | 0 | 1 |
| 2,0 | 3 | 0 | 1,2 | 2 | 3,0 | 0 |
| 1 | 2,3 | 3 | 0,2 | 1 | 2 | 3 |
| 0 | 1 | 2 | 3 | 0 | 1,3 | 2 |

FIG. 7B

| 0 | 1 | 2 | 3,4 | 0 | 1 | 2 |
|---|---|---|---|---|---|---|
| 3 | 0,4 | 1 | 2 | 3 | 0 | 1 |
| 2,4 | 3 | 0 | 1,4 | 2 | 3,4 | 0 |
| 1 | 2,4 | 3 | 0,4 | 1 | 2 | 3 |
| 0 | 1 | 2 | 3 | 0 | 1,4 | 2 |

METHOD AND APPARATUS FOR REDUNDANT IMAGE ENCODING AND DECODING

BACKGROUND OF THE INVENTION

This application claims the priority of Korean Patent Application No. 2003-6287, filed on Jan. 30, 2003, in the Korean Intellectual Property Office, the disclosure of which is incorporated herein in its entirety by reference.

1. Field of the Invention

The present invention relates to a method and apparatus for image encoding and decoding, and more particularly, a method and apparatus for redundant image encoding and decoding of part of slices used for image encoding.

2. Description of the Related Art

A general image is compressed when redundant information is removed. When a moving image is compressed using this method, in general, temporal/spatial predictive encoding, transform/quantization encoding, and entropy encoding are sequentially performed.

When a compressed image is generated as a bitstream and is transmitted via a network, burst errors or packet loss errors occur. When these errors occur, a bitstream next to a portion in which errors occur cannot be decoded. In order to solve such a disadvantage, a conventional method by which a piece of image divided in units of a plurality of slices is encoded such that errors occur only in a corresponding slice, has been proposed. However, in the conventional method, when one slice is damaged by errors, picture quality of a corresponding image is damaged, and then, the errors are propagating throughout an image generated through spatial predictive encoding by referring to a damaged slice.

In order to prevent error propagation, a piece or part of an image in which temporal predictive encoding is not used is used periodically. In this method, error propagation can be prevented, but a bit number increases greatly, and thus, the method is used restrictively.

Thus, in the prior art, when an image is encoded in units of slices, the size of the slice is made small so that the slices are robust with an error. However, as the size of the slice becomes smaller, the number of bits needed to encode a slice header increases, and the number of bits to be encoded increases due to a compression loss which is generated because predictive encoding cannot be performed.

According to an MPEG-4 or a H.263 international standard, a slice is designated in units of bit numbers having a predetermined size or a series of macroblocks having a 16×16 size. In this case, when errors occur in one slice, the slice is damaged by the errors, and thus, a predetermined region of an image is damaged, and subjective picture quality is lowered. In order to solve this disadvantage, according to a recommendable proposal provided by a Joint Video Team (JVT) final committee, a flexible macroblock ordering (FMO) method is used. In this method, a slice is composed of arbitrary macroblocks. In this case, if errors occur in one slice, a macroblock included in the slice is not too much arranged in a particular area of an image, but is scattered over several regions of the image such that the damage of subjective picture quality is alleviated and an error concealment method using an undamaged peripheral block can be easily used.

Also, the recommendable proposal provided by the JVT final committee provides a redundant slice method by which the same one encoded slice is redundantly transmitted. However, this method can be effectively used when the size of the slice is small, but when the size of the slice is large, due to the increased number of bits of a redundantly-transmitted slice, an encoding efficiency is lowered.

Meanwhile, in the case of temporal predictive encoding used in a conventional image compression method, errors occurring in one point in time are continuously propagated over a next image. In order to prevent this error propagation, an intra-updating scheme for encoding sine part of an image without temporal predictive encoding is used. In this case, an encoding efficiency is lowered.

Also, in another conventional multiple encoding method, an image is encoded in units of bitstreams, and each bitstream is independently decoded, so as to improve error robustness. In this case, when each bitstream is independently decoded, an encoding efficiency is lowered, and the structure of a decoder becomes complicated so that each bitstream is independently decoded or decoded by adding to each other.

Further, in a conventional layer encoding method, information composed of a base layer and upper layers is encoded, and in a data division method, information composed of header information, motion information, and texture information is encoded. Even in this case, an additional encoding/decoding process is required, and important information needs to be separately protected so as to embody error robustness.

SUMMARY OF THE INVENTION

The present invention provides a method and apparatus for redundant image encoding and decoding, in which, by using a slice structure used for image encoding to redundantly encode and decode part of an image, a high encoding efficiency is maintained, and robustness with respect to errors is improved by considering both an error occurrence rate and a redundantly-encoded bit number regardless of the size of the slice.

According to an aspect of the present invention, there is provided an apparatus for redundantly encoding a predetermined region of an image. The apparatus includes a slice modeling unit which determines the structures of slices to be used in encoding the image and regions to be redundantly encoded so that image data of a predetermined region of the image to be redundantly encoded is contained in a plurality of slices, a slice allocation unit which allocates image data of each region of an image to the plurality of slices, a picture header encoding unit which encodes information required to decode the plurality of encoded slices and generates picture information, and a slice encoding unit which encodes the image in units of slices according to the picture header information.

Preferably, the slice modeling unit includes a slice structure modeling portion which determines the structures of the plurality of slices to be used for image encoding, and a redundant encoding modeling portion which determines the position and amount of regions to be redundantly encoded from the image using the plurality of slices.

Preferably, the slice encoding unit includes a slice header encoding portion which generates a slice header containing information used to encode a macroblock in the slice, a temporal/spatial predictive encoding portion which performs temporal/spatial predictive encoding in units of slices of the image, a transform quantization portion which transforms the temporal/spatial predictively-encoded data into a frequency region and quantizes the data, and an entropy-encoding portion which entropy-encodes the quantized data.

Also, the slice modeling unit divides the image into at least one rectangular region and the other region and determines the structures of the slices so that each of the regions is included in at least one independent slice.

Also, the slice modeling unit determines regions to be redundantly encoded by detecting regions where motions are actively performed, from the image.

Preferably, the picture header encoding unit encodes picture header information containing the structure, position, and size of each slice.

Preferably, the slice header includes flag information which indicates whether the slice to be encoded includes only regions to be redundantly encoded.

According to another aspect of the preset invention, there is provided an apparatus for redundant image decoding. The apparatus includes a picture header decoding unit which decodes picture header information containing the structures, positions, and sizes of slices in a bitstream where image data are encoded, a slice construction unit which determines the structures and positions of a plurality of slices to be decoded according to the picture header information, a slice decoding unit which decodes an image in units of slices according to the picture header information, and an image construction unit which disposes a decoded slice image according to the structure and position of the slice determined by the slice construction unit and restores and outputs the image. Predetermined regions of at least two slices of the plurality of slices constructed by the slice construction unit are overlapped on each other.

Preferably, the slice decoding unit includes an entropy-decoding portion which entropy-decodes an inputted bitstream in units of slices according to the position and size information of the slices, an inverse-transform quantization portion which performs inverse-quantization of entropy-decoded image data, performs inverse-transform of the inversely-quantized image data into a temporal region, and generates temporal/spatial predictively-encoded image data, and an image restoration portion which restores an image by compensating the temporal/spatial predictively-encoded image data.

According to still another aspect of the present invention, there is provided a method for redundantly encoding a predetermined region of an image. The method comprises (a) determining the structures of slices to be used in encoding the image and regions to be redundantly encoded so that image data of a predetermined region of the image to be redundantly encoded is contained in a plurality of slices, (b) allocating image data of each region of an image to the plurality of slices, (c) encoding information required to decode the plurality of encoded slices and generating picture information, and (d) encoding the image in units of slices according to the picture header information.

In (a), the image is divided into at least one rectangular region and the other region, and the structures of the slices are determined so that each of the regions is included in at least one independent slice.

Preferably, in (a), regions to be redundantly encoded are determined by detecting regions where motions are actively performed, from the image.

Preferably, (a) comprises determining the structures of the plurality of slices to be used for image encoding, and determining the position and amount of regions to be redundantly encoded from the image using the plurality of slices.

Preferably, in (c), picture header information containing the structure, position, and size of each slice is encoded.

Preferably, (d) comprises generating a slice header containing information used to encode a macroblock in the slice, performing temporal/spatial predictive encoding in units of slices of the image, transforming the temporal/spatial predic-tively-encoded data into a frequency region and quantizing the data, and entropy-encoding the quantized data. More preferably, the slice header includes flag information which indicates whether the slice to be encoded includes only regions to be redundantly encoded.

According to yet still another aspect of the present invention, there is provided a method for redundant image decoding. The method comprises (a) decoding picture header information including the structures, positions, and sizes of slices in a bitstream where image data are encoded, (b) determining the structures and positions of a plurality of slices to be decoded according to the picture header information, (c) decoding an image in units of slices according to the picture header information, and (d) disposing a decoded slice image according to the structure and position of the slice determined in (b) and restoring and outputting the image. Predetermined regions of at least two slices of the plurality of slices constructed in (b) are overlapped on each other.

Preferably, (c) comprises entropy-decoding an inputted bitstream in units of slices according to the position and size information of the slices, performing inverse-quantization of entropy-decoded image data, performing inverse-transform of the inversely-quantized image data into a temporal region, and generating temporal/spatial predictively-encoded image data, and restoring an image by compensating the temporal/spatial predictively-encoded image data.

BRIEF DESCRIPTION OF THE DRAWINGS

The above and other aspects and advantages of the present invention will become more apparent by describing in detail preferred embodiments thereof with reference to the attached drawings in which.

DETAILED DESCRIPTION OF THE INVENTION

Hereinafter, preferred embodiments of the present invention will be described in detail, examples of which are illustrated in the accompanying drawings.

Figure 1A:
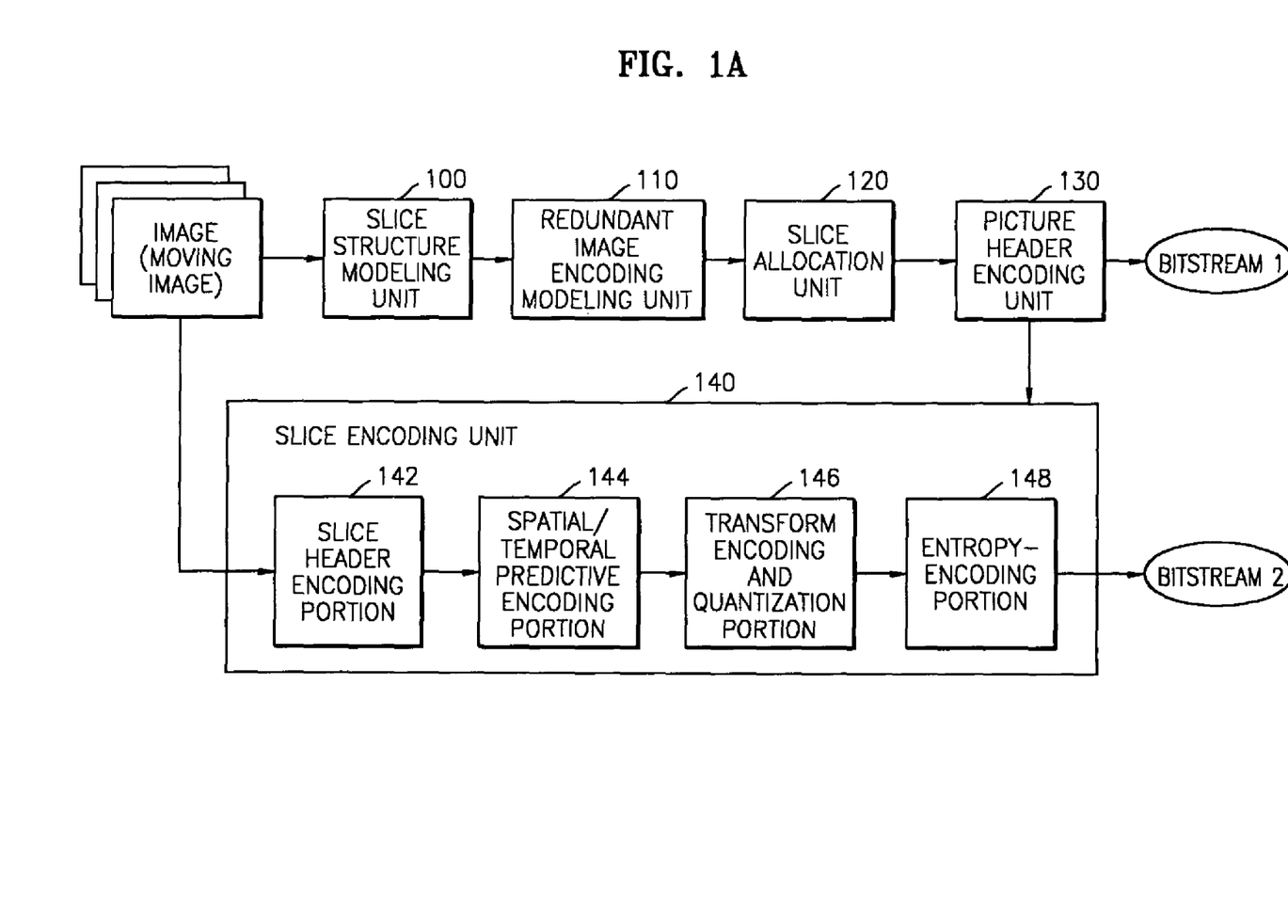
FIG. 1A is a block diagram illustrating the structure of an apparatus for redundant image encoding to improve error robustness according to an embodiment of the present invention.

FIG. 1A is a block diagram illustrating the structure of an apparatus for redundant image encoding to improve error robustness according to an embodiment of the present invention. The apparatus includes a slice structure modeling unit 100 which determines a slice structure to be used for encoding of an inputted image, a redundant image encoding modeling unit 110 which determines the position and amount of regions to be redundantly encoded from the inputted image, a slice allocation unit 120 which allocates each region of the inputted image to a determined slice, a picture header encoding unit 130 which encodes common information required to decode all slices in an image, and a slice encoding unit 140 which encodes the inputted image in units of slices.

Also, the slice encoding unit 140 includes a slice header encoding portion 142, a spatial/temporal predictive encoding portion 144, a transform encoding and quantization portion 146, and an entropy-encoding portion 148.

Figure 1B:
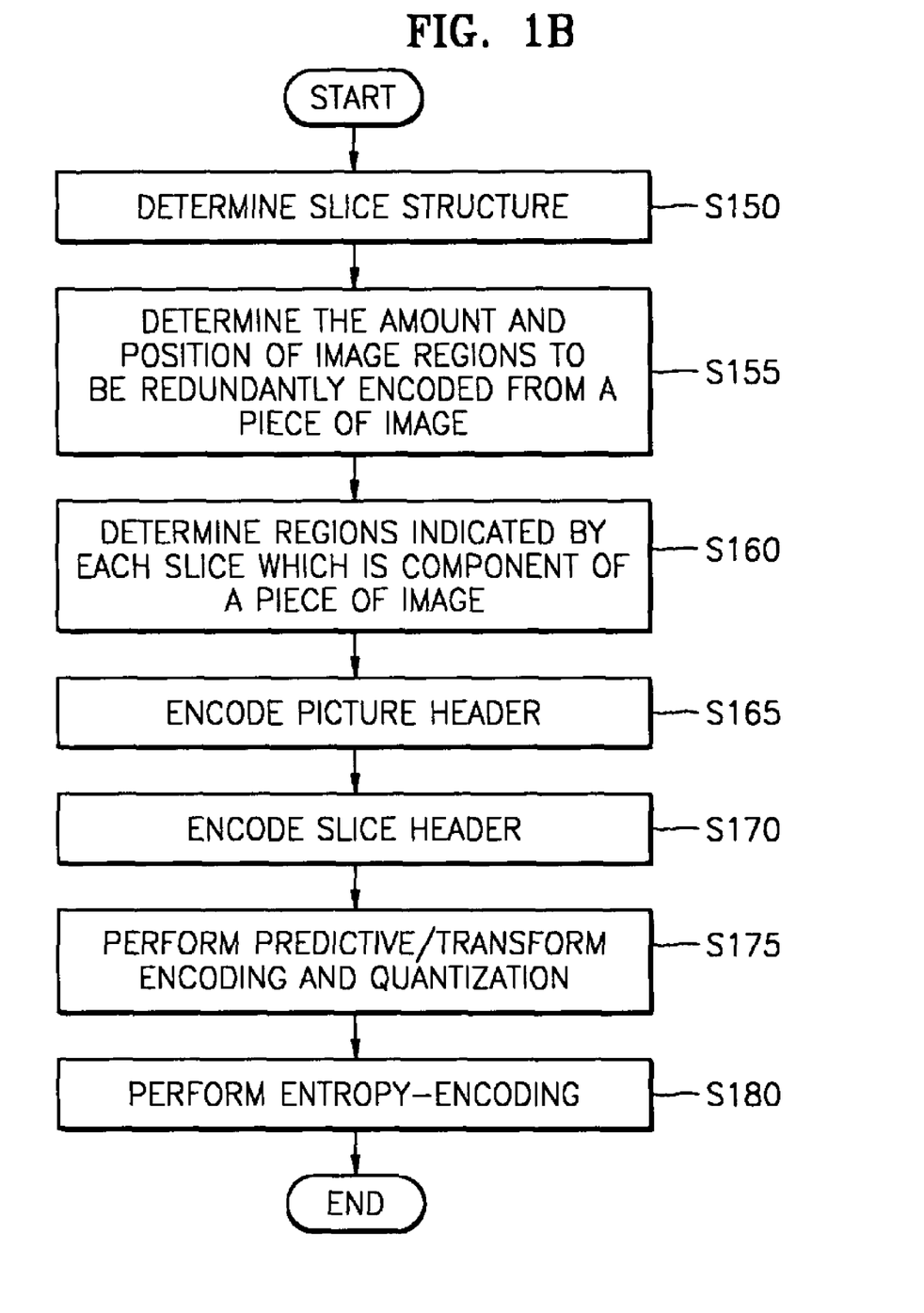
FIG. 1B is a flowchart illustrating a method for redundant image encoding to improve error robustness according to an embodiment of the present invention.

FIG. 1B is a flowchart illustrating a method for redundant image encoding to improve error robustness according to an embodiment of the present invention.

Hereinafter, the method for redundant image encoding will be described with reference to FIGS. 1A and 1B.

An image (moving image) to be encoded is inputted into the slice structure modeling unit 100 and the slice encoding unit 140, respectively. The slice structure modeling unit 100 determines a slice having a certain structure (shape) when a piece of inputted image is divided into independent slices and is encoded so that a desired region can be independently encoded in a piece of inputted image (S150). In this case, the slice structure may be composed of a series of macroblocks or a set of macroblocks at certain positions. In addition, an image may be divided into regions (region of interest (ROI)) and the other region (background region), and each region may be composed of independent slices. In addition, a single slice structure may be used in a piece of image, and combined slice structures may be used in the piece of image. A minimum unit of a region indicated by these slices is a macroblock. The slice structure modeling unit 100 outputs the determined slice structure to the redundant image encoding modeling unit 110.

The redundant image encoding modeling unit 110 determines the amount of regions to be redundantly encoded from an inputted image by considering an error occurrence rate and a channel bandwidth in a network environment where encoded image data is to be transmitted, determines regions to be redundantly encoded from an image, and outputs the determined regions to the slice allocation unit 120 (S155).

Regions to be redundantly encoded may be at certain positions of an image, or by selecting a predetermined region, i.e., a region of interest (ROI), which is a portion regarded as subjectively important in an entire image, or a region where motions are actively performed, or a portion where errors occur easily or it is difficult to conceal errors.

When regions at certain positions of an image are redundantly encoded, the regions are redundantly encoded as a number of macroblocks predetermined according to a redundantly-encoded amount in a predetermined order, for example, in the order of macroblock addresses. When the slice structure composed of a series of macroblocks is used, the regions can be redundantly encoded as a number of a series of macroblocks predetermined according to a redundantly-encoded amount in a predetermined order, for example, downwardly.

When a predetermined region (region of interest (ROI)) is redundantly encoded, a more interested portion from a user's viewpoint in a piece of image is determined as the ROI, and this portion is encoded with high picture quality and has improved subjective picture quality. In this case, the amount of a redundantly-encoded portion corresponding to the ROI is larger than that of the background region, and the ROI is better protected from errors such that, when errors occur in a transmitted image, error occurrence of the ROI is minimized and subjective picture quality of the ROI can be improved.

When the predetermined region is redundantly encoded, the portion where motions are actively performed is redundantly encoded, and thus, errors can be reduced by error concealment of a region where motions are actively performed. In this case, the region where motions are actively performed is set based on the size of a motion vector used for motion compensation, or the sum of absolute difference (SAD) between a previous image region and a current image region referred to the motion vector, and the region can be set to a redundant image encoding region.

Figure 3A:
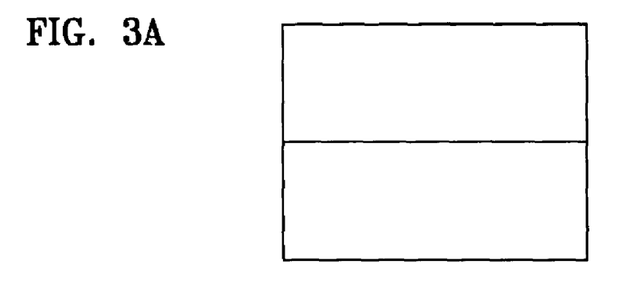
FIGS. 3A through 3D illustrate examples of a method for redundant image encoding used in a slice structure composed of a series of macroblocks.

The slice allocation unit 120 receives the determined slice structure and the amount and position of an image region to be redundantly encoded from the redundant image encoding modeling unit 110, allocates image data of each region of an image to each slice according to the slice structure determined by the slice structure modeling unit 100, that is, allocates regions of an image to each slice so that the region determined by the redundant image encoding modeling unit 110 is redundantly encoded (S160). In this case, the slice allocation unit 120 allocates an inputted image to each slice by adjusting the slice structure, size, and position according to the amount of the image region to be redundantly encoded. Here, a slice may be composed of only redundant regions. A slice can be composed of only regions to be redundantly encoded. In this case, a flag which indicates that the slice is composed of only redundant regions, may be marked in a header of the slice. When the flag is marked in the header of the slice and errors do not occur in other slices including redundant regions, the slice may be not decoded by referring to this header information. An example in which redundant image encoding is performed according to a variety of slice structures will be described later with reference to FIG. 3.

The picture header encoding unit 130 encodes common information required to decode all slices in an image, in particular, encodes the number of slices in the image, each slice structure, and a region indicated by each slice, i.e., information which indicates a macroblock corresponding to each slice, as picture header information, and outputs the same information as the encoded picture header information to the slice encoding unit 140 (S165).

The slice encoding unit 140 encodes the inputted image in units of slices. For this purpose, the slice header encoding portion 142 encodes common information used to encode a macroblock in a slice according to the header information inputted by the picture header encoding unit 130 (S170). If all the macroblocks in the slice are redundantly encoded, information which indicates that a corresponding slice includes only redundant encoded information, can be encoded at the slice header.

The spatial/temporal predictive encoding portion 144 removes spatial/temporal redundant information and outputs the removed information to the transform encoding and quantization portion 146, and the transform encoding and quantization portion 146 performs DCT transform in units of slices on the inputted image, transforms the inputted image into a frequency region, quantizes a transform coefficient with a predetermined quantization bit, and thus, the information is compressed (S175).

Image data in units of slices inputted from the transform encoding and quantization portion 146 is entropy-encoded and generated by the entropy-encoding portion 148 as a final bitstream using a predetermined entropy-encoding method (S180).

A redundant region is once encoded in the slice encoding unit 140, and the same information may be contained in slices and be transmitted to the redundant region. In this case, encoding is only once performed, and a computational amount is small. Meanwhile, when each redundant region may be encoded in each slice, the redundant region is encoded using different quantization intervals in each slice, and thus, picture quality difference may occur. That is, one slice may be encoded with high picture quality, and the other slices may be encoded with low picture quality. If errors do not generate in both regions during decoding, an image is decoded using high-picture quality slices.

In the case of a slice composed of only redundantly-encoded information, the information is compressed with a large compression rate, or only important information is contained in the slice, and thus, an encoding efficiency can be improved. That is, picture quality can be lowered by performing quantization many times, and an image having lowered picture quality is used only when errors occur, and thus, error robustness can be improved only with a small number of bits. When only important information is contained in the slice, the slice is composed of important information such as a macroblock header, a macroblock header and a motion vector, a macroblock header, a motion header, and a DC coefficient contained in a DCT coefficient, and thus, redundant image encoding can be performed with a small number of bits.

Hereinafter, the method and apparatus for redundant image decoding will be described with reference to FIGS. 2A and 2B.

Figure 2A:
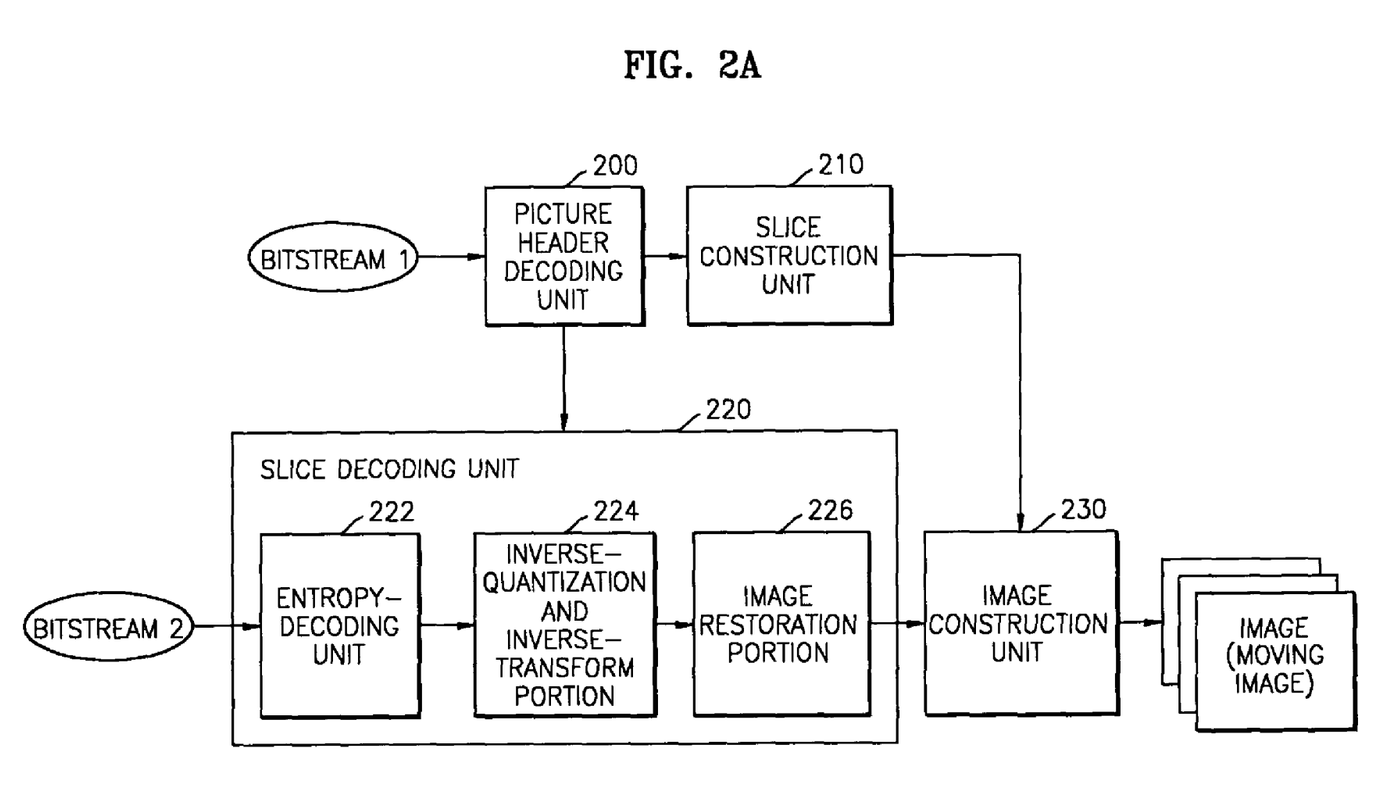
FIG. 2A is a block diagram illustrating the structure of an apparatus for redundant image decoding to improve error robustness according to an embodiment of the present invention.

FIG. 2A is a block diagram illustrating the structure of an apparatus for redundant image decoding to improve error robustness according to an embodiment of the present invention. The apparatus includes a picture header decoding unit 200 which decodes picture header information, a slice construction unit 210 which determines the position of a decoded slice according to the decoded picture header information, a slice decoding unit 220 which decodes an image in units of slices by referring to the picture header information, and an image construction unit 230 which disposes a decoded slice image according to the position of the slice determined by the slice construction unit 210 and restores and outputs the image. Also, the slice decoding unit 220 includes an entropy-decoding portion 222, an inverse-quantization and inverse-transform portion 224, and an image restoration portion 226.

Figure 2B:
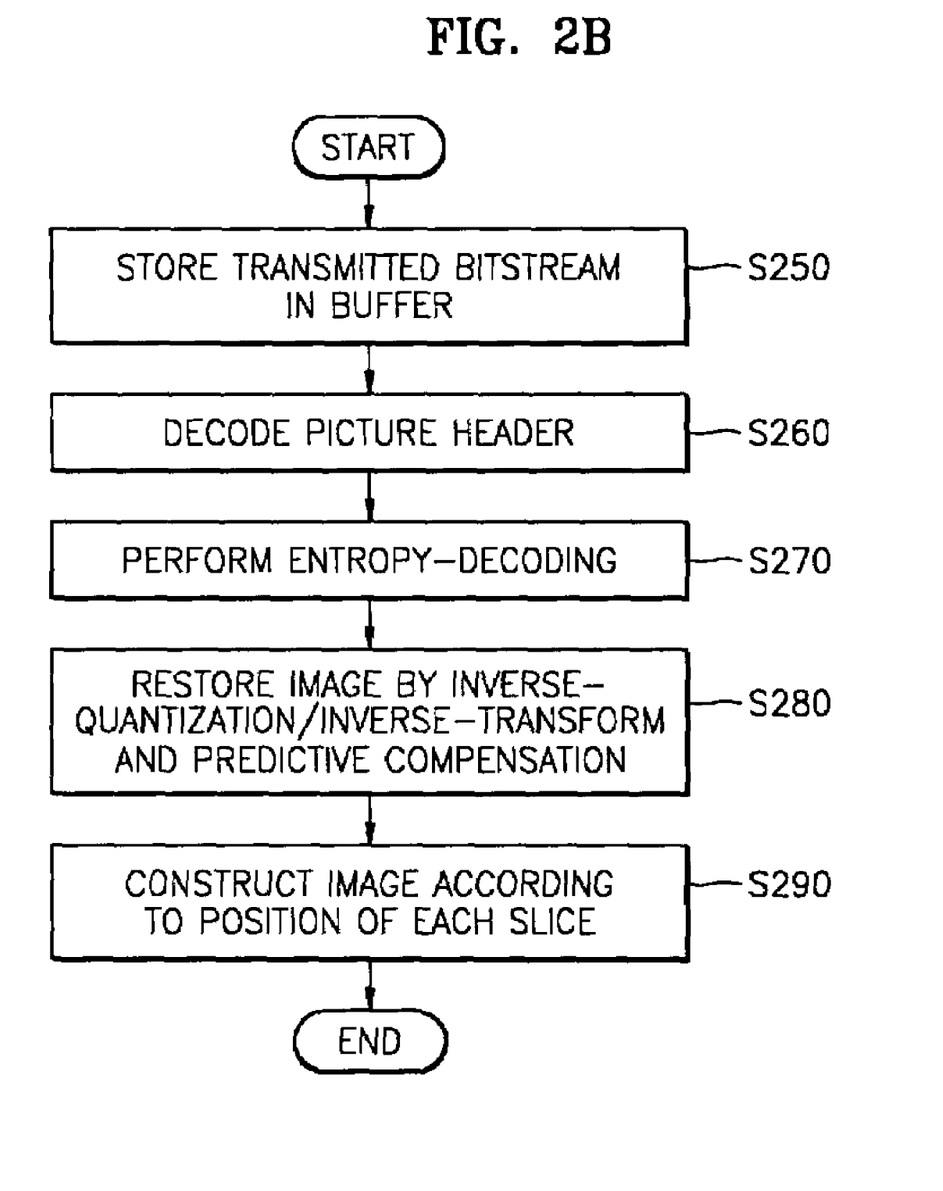
FIG. 2B is a flowchart illustrating a method for redundant image decoding to improve error robustness according to an embodiment of the present invention.

FIG. 2B is a flowchart illustrating a method for redundant image decoding to improve error robustness according to an embodiment of the present invention. Referring to FIGS. 2A and 2B, the apparatus for redundant image decoding stores a transmitted bitstream in a buffer (not shown) temporarily, outputs header information from the stored bitstream to the picture header decoding unit 200, and outputs image data encoded in units of slices to the slice decoding unit 220 (S250).

The picture header decoding unit 200 decodes the picture header information in the inputted bitstream, outputs information on the number of slices, shape, position, and size of a slice to the slice construction unit 210, and outputs other information to the slice decoding unit 220 (S260).

The slice construction unit 210 selects the position of the slice so that each slice decoded using the information inputted by the picture header decoding unit 200 forms one image. In this case, a case where a region represented by different slices is overlapped on another region means that a macroblock of a corresponding region is redundantly encoded. If errors occur in any slice of two slices, information on a region where errors occur is discarded, and information on an overlapped portion is restored using information on a slice where errors do not occur.

The slice decoding unit 220 decodes an image in units of slices by referring to the inputted picture header information. First, the entropy-decoding portion 222 entropy-decodes the inputted bitstream, decodes a slice header, and uses the decoded information to decode all macroblocks in the slice. After that, the entropy-decoding portion 222 outputs the image data in units of the entropy-decoded slices to the inverse-quantization and inverse-transform portion 224 (S270). If a flag which indicates that a corresponding slice is composed of only redundant information is set in the slice header, redundantly-encoded slices are not decoded when errors do not occur in other decoded slices. However, when errors occur in decoded slices, errors are restored by decoding redundantly-encoded slices. If a slice is composed of only specific information, i.e., important information such as a macroblock header, a motion vector, a discrete cosine (DC) coefficient contained in a discrete cosine transform (DCT) coefficient, an image is restored with the information.

The inverse-quantization and inverse-transform portion 224 performs inverse-quantization on inputted image data using the same number of bits as the number of bits used for quantization, performs inverse-transform of transform performed on inverse-quantized image data during IDCT encoding, restores the image data from a frequency region to a spatial region in units of slices, and outputs the restored image data to the image restoration portion 226. The image restoration portion 226 restores the image by compensating the temporal/spatial predictively-encoded image data and outputs the restored image to the image construction potion 230 (S280).

The image construction portion 230 restores the images restored in units of slices into a piece of image according to position information of a slice inputted by the slice construction unit 210 (S290). In this case, when errors do not occur in all of the redundantly-decoded portions, the image is constructed using one portion. When there is a difference in picture quality between redundant regions, the portion which is encoded with the highest picture quality, is used. When errors occur in one portion of the redundantly-decoded portions, the image is constructed using only a portion where errors do not occur.

FIG. 3A through FIG. 6 illustrate a method for redundant image encoding according to a variety of slice structures.

When an image is encoded, a slice structure suitable for a user's environment among a variety of slice structures is selected by the slice structure modeling unit 100 shown in FIG. 1A. When a simple slice structure is required, for example, because the user's terminal performance is restricted or because a transmission environment of few errors and wide bandwidth is used, a slice composed in units of a series of macroblocks is used.

In addition, a user can use a rectangular slice structure to perform region of interest (ROI) encoding effectively. In this case, the region of interest (ROI) is a portion regarded as subjectively important by a user and is contained in the rectangular slice region. Here, ROI encoding is a technique that a portion regarded as subjectively important by the user is encoded with high picture quality, and a region excluding the portion, i.e., a background region, is compressed with a high compression rate, and thus, an overall subjective picture quality can be improved at a restricted bit rate. In this case, when an image is transmitted in an environment where errors occur, the ROI contained in the rectangular slice structure is redundantly encoded and better protected from the errors than in the background region, and thus, subjective picture quality can be improved.

Meanwhile, a slice may be composed of a set of macroblocks at predetermined positions. In this case, the macroblocks, which are components of a slice, are scattered over an entire image. Thus, even when errors occur in one slice, the errors do not preponderantly occur in a predetermined region of the image but are scattered over the entire image, and thus, an effect caused by the errors can be reduced. In particular, when redundant image encoding is performed using the slice structure, the user can select a macroblock to be redundantly-encoded as he wishes. In this case, the macroblock to be redundantly-encoded is selected among the regions where motions are actively performed, or regions where errors easily occur or it is difficult to conceal errors, and thus, error robustness can be improved.

Figure 3B:
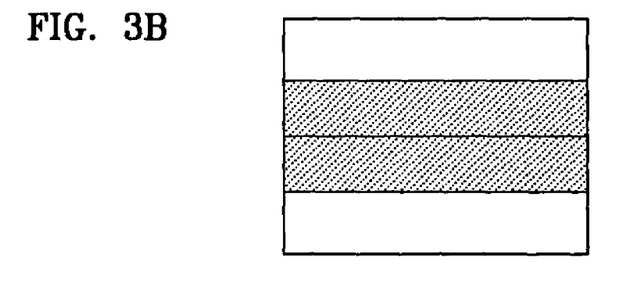

FIGS. 3A through 3D illustrate examples of a method for redundant image encoding used in a slice structure composed of a series of macroblocks. The slice structure composed of a series of macroblocks is simple. FIG. 3A illustrates a case where a slice is composed of a series of macroblocks in a piece of image, and FIG. 3B illustrates a case where a central portion of an image is redundantly encoded.

Figure 3C:
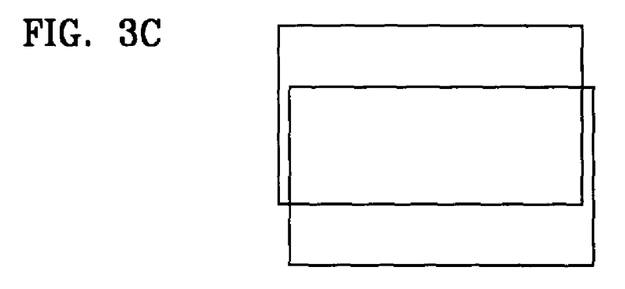
Figure 3D:
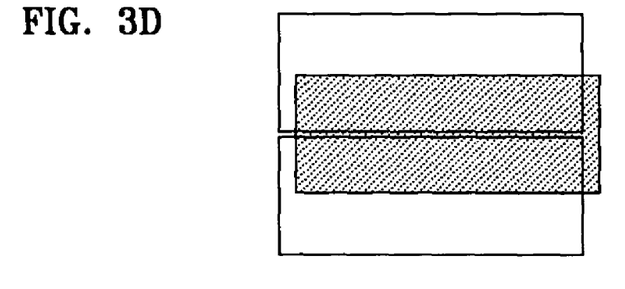

A further-embodied example of a case where the image of FIG. 3B is redundantly encoded is shown in FIGS. 3C and 3D. FIG. 3C illustrates a case where the image is redundantly encoded by forming slices so that regions indicated by two slices composed of a series of macroblocks is overlapped on each other. FIG. 3D illustrates a case where two slices composed of a series of macroblocks is constructed as shown in FIG. 3A and redundant image encoding is performed using a slice composed of a series of additional macroblocks.

Figure 4:
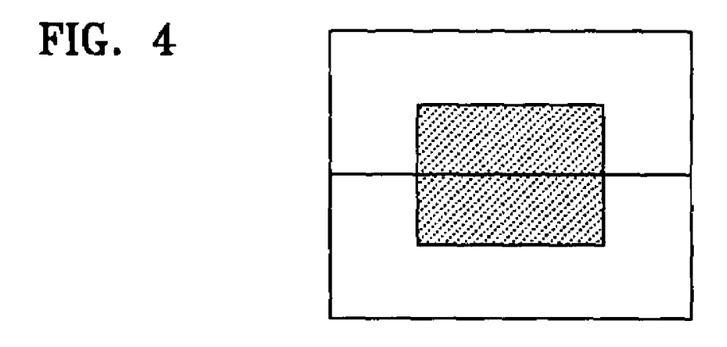
FIG. 4 illustrates an example of a method for redundant image encoding using additional rectangular slices.

FIG. 4 illustrates an example of a method for redundant image encoding using additional rectangular slices. A slice having all possible structures may be used in a region excluding the additional rectangular slices shown in FIG. 4. In one embodiment, the rectangular slices include the ROI, such that the ROI is robust with respect to errors and subjective picture quality of the ROI can be improved.

Figure 5A:
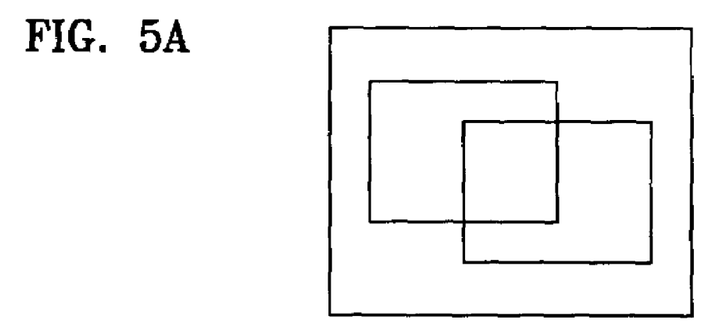
FIGS. 5A and 5B illustrate examples of a method for redundant image encoding using a case where rectangular slices are overlapped with each other.
Figure 5B:
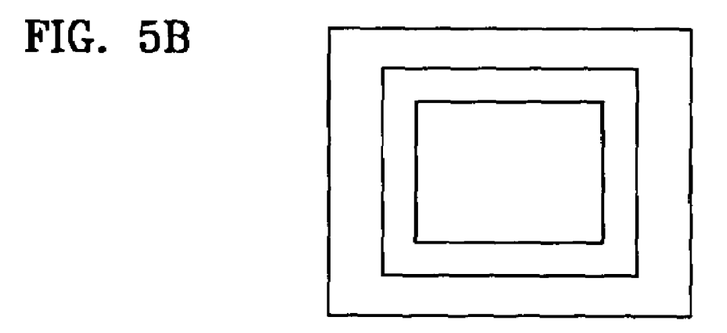

FIGS. 5A and 5B illustrate examples of a method for redundant image encoding in a case where rectangular slices are overlapped with each other. The structure shown in FIGS. 5A and 5B is used in an FMO mode 2, which is a recommendation proposed by a Joint Video Team (JVT) final committee. This method is a technique in which an image is divided into rectangular regions (ROI) and another region (e.g., a background region) and each region is encoded as slices. FIG. 5A illustrates a case where for two different rectangular regions, neither region completely includes the other region but part of each of the regions are overlapped on each other, and FIG. 5B illustrates a case where one rectangular region completely includes another rectangular region and is over-lapped on each other. In the two cases, the portion where rectangular regions are overlapped on each other is redundantly encoded. In one embodiment, the overlapped portion includes the ROI, such that the ROI is robust with respect to errors and subjective picture quality of the ROI can be improved. When the rectangular slice structure is used, the rectangular regions can be independently encoded, and thus may be used as separate images. That is, a picture-in-picture (PIP) scheme can be supported, and using redundant image encodings, a PIP which indicates a variety of positions can be supported in FIG. 5A, and a PIP having a variety of sizes can be supported in FIG. 5B.

Figure 6A:
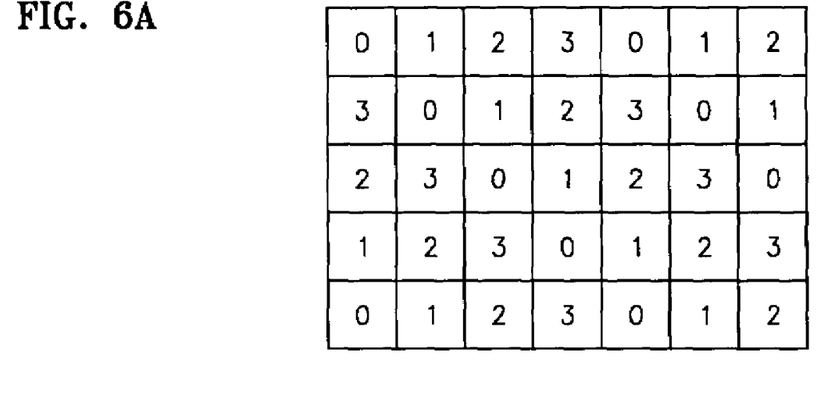
FIGS. 6A through 6C illustrate examples in which a predetermined region is redundantly encoded in the slice structure composed of macroblocks.
Figure 6B:
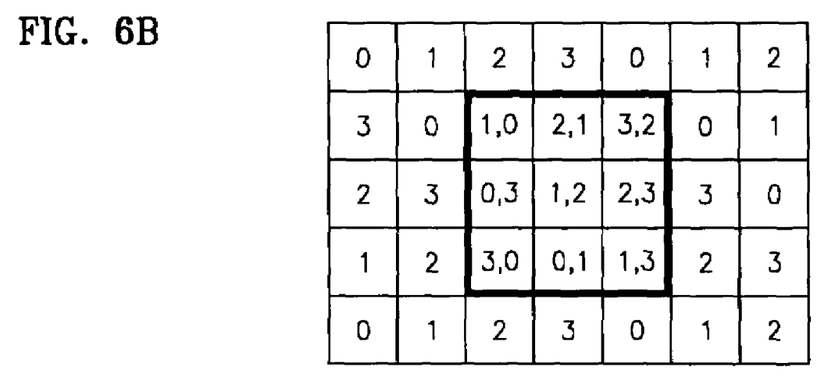
Figure 6C:
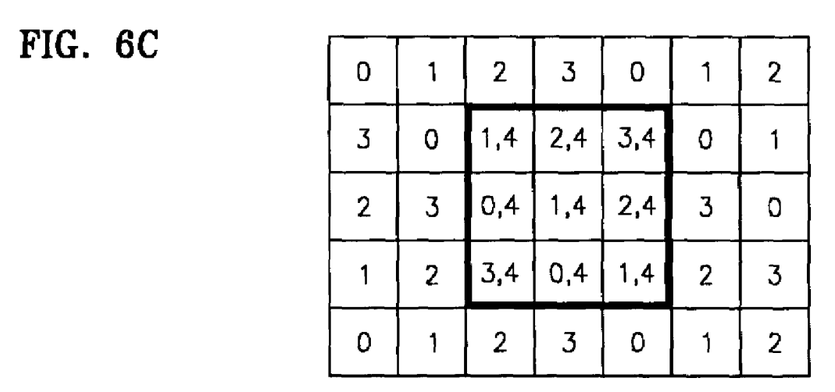

FIGS. 6A through 6C illustrate examples in which a pre-determined region is redundantly encoded using the slice structure composed of macroblocks. A number in a small rectangle of FIGS. 6A through 6C indicates a slice to which a corresponding region of an image to be encoded corresponds. That is, the image shown in FIGS. 6A through 6C are composed of four slices having numbers from 0 to 3.

FIG. 6A illustrates an example of a slice composed of a macroblock. This method can be embodied using an FMO mode 1 or mode 6, which is a recommendable proposal proposed by a JVT final committee. FIGS. 6B and 6C illustrates cases where a specific portion of the image is redundantly encoded. Specifically, FIG. 6B illustrates a case where a center region of the image is redundantly encoded by four slices, and FIG. 6C illustrates a case where the center region of the image is redundantly encoded using an additional slice indicated by a number 4 other than the four slices. In this case, the ROI is used as a redundantly-encoded region, and thus, subjective picture quality of the ROI can be improved.

Figure 7A:
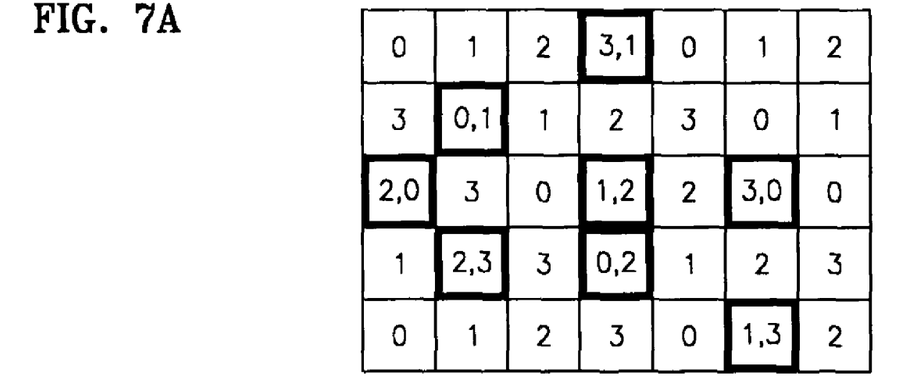
FIGS. 7A and 7B illustrate examples in which a region is redundantly encoded in the slice structure composed of macroblocks.
Figure 7B:
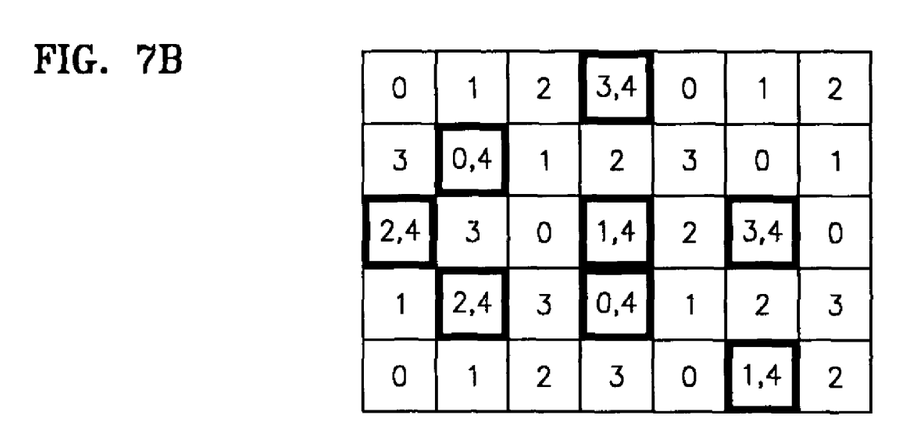

FIGS. 7A and 7B illustrate examples in which scattered regions are redundantly encoded in the slice structure composed of macroblocks. FIG. 7A illustrates a case where regions indicated by four slices is overlapped on each other, similar to FIG. 6B, and FIG. 7B illustrates a case where regions of the image is redundantly encoded using an additional slice indicated by a number 4 other than the four slices, similar to FIG. 6C.

The positions of the regions to be redundantly encoded when redundant image encoding is performed, are determined by the redundant image encoding modeling unit 110 shown in FIG. 1A. A certain position in the image, a specific region, i.e., a portion regarded as subjectively important such as a region of interest (ROI), a region where motions are actively performed, or a portion where errors easily occur or it is difficult to conceal errors, may be selected as the positions of the regions.

The amount of the regions to be redundantly encoded may be determined according to the degree of errors occurring in a network channel. That is, in the case of a channel where much errors occur, the amount of the regions to be redundantly encoded is increased such that error losses are reduced, and in the case of a channel where a little errors occur, the amount of the regions to be redundantly encoded is reduced such that a compression efficiency can be improved.

In addition, the amount of an image to be redundantly encoded may be adjusted by the efficiencies of encoding and decoding methods. That is, the amount of the image to be redundantly encoded may be adjusted by the compression efficiency, whether it supports another error robustness method or not, and the efficiency of the error robustness method. For example, when an intra-updating method is used with the encoding and decoding methods, in the prior art, the number of macroblocks to be encoded as an intra-image is determined according to an error occurrence rate. However, when the encoding and decoding methods are used with the encoding and decoding methods according to the present invention, these macroblocks are redundantly encoded, and the number of macroblocks to be encoded as an intra-image can be reduced. In this case, a bit number of the redundantly-encoded macroblocks is much smaller than a bit number of macro-blocks encoded as the intra-image, and thus, an encoding efficiency can be improved.

A Lagrangian optimization method considering a compression efficiency and rate-distortion caused by errors, or an optimized path searching method using dynamic programming may be used to take the aforementioned elements into account. The Lagrangian optimization method considering rate-distortion is expressed as shown in Equation 1.

$$J=D+\lambda R \qquad (1)$$

D is distortion caused by losses or errors occurring when an image is encoded, and a sum of absolute difference (SAD) or a mean square error (MSE) is used as D. In addition, $\lambda$ is a Langrangian coefficient, and R is a bit rate.

When a probability that errors occur is p, D may be divided into distortion Dc after errors are restored through error concealment when errors occur and distortion Dq caused by lossy compression such as quantization when errors do not occur. Thus, the Lagrangian optimization method is expressed as shown in Equation 2.

$$J=pDc+(1-p)Dq+\lambda R \qquad (2)$$

When redundant image encoding is performed, in Equation 2, r, which is a redundantly-encoded amount, is added to the bit rate, and the value of distortion Dc is changed into Dr according to the redundantly-encoded amount. Thus, the Lagrangian optimization method is expressed as shown in Equation 3.

$$J=pDr+(1-p)Dq+\lambda(R+r) \qquad (3)$$

The value of r used to minimize J can be determined in Equation 3.

Until now, the method for redundant image encoding when an image is encoded in units of slices, has been explained as a preferred embodiment of the present invention. In the method for redundant image encoding according to the present invention, simple and additional image encoding and decoding methods are not required, and the structures of existing image encoding and decoding apparatuses can be used without any changes, such that the method for redundant image encoding according to the present invention can be adopted to a slice structure and different encoding methods such as a data division method and a layer encoding method.

Figure 8:
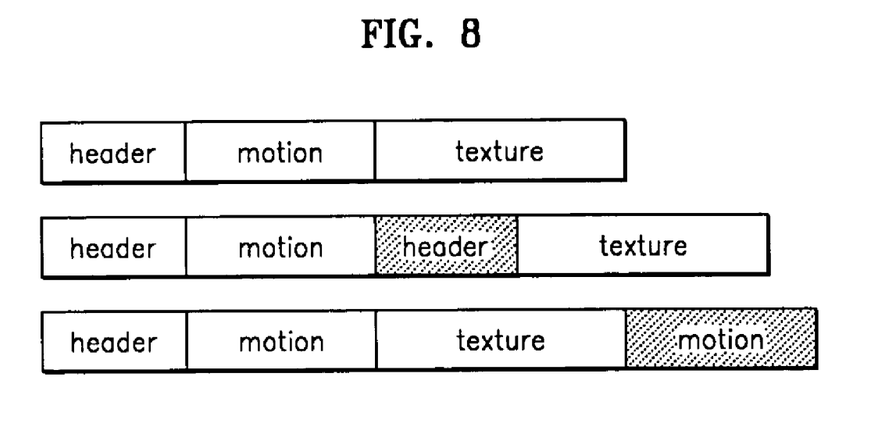
FIG. 8 illustrates a case where part of header information or motion information is redundantly encoded in a data division method.

FIG. 8 illustrates a case where part of header information or motion information is redundantly encoded in a data division method. When, in the data division method, header information, motion information, and texture information are encoded, if the header information is important, important information can be protected by encoding the header information redundantly, and if the motion information is important, the information itself or part of the information can be redundantly encoded.

Figure 9:
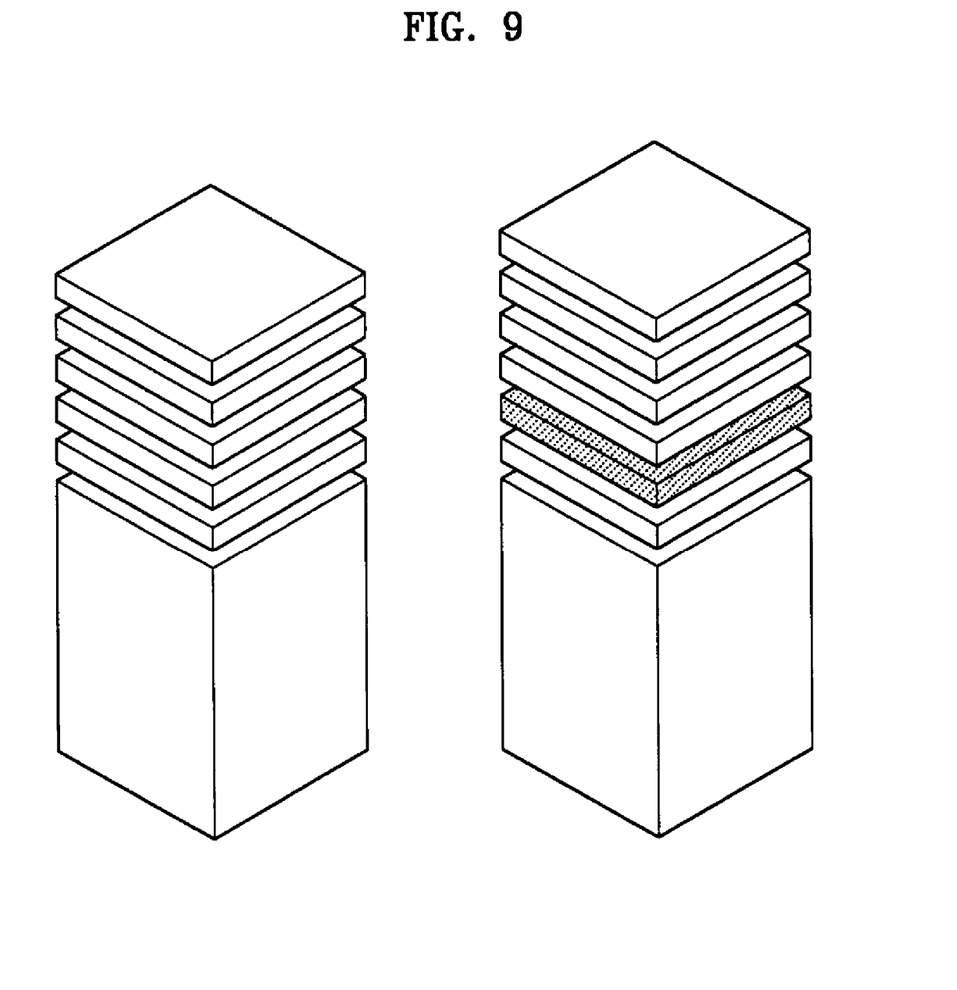
FIG. 9 illustrates an example in which a most significant bit slice is redundantly encoded in an upper layer using a fine granularity scalability (FGS) method.

FIG. 9 illustrates an example in which a most significant bit slice is redundantly encoded in an upper layer in a fine granularity scalability (FGS) method. Information on a base layer is most important in the layer encoding method. This information is encoded as in the method for redundant image encoding using the aforementioned slice structure, and thus can be effectively protected. With regard to information on an upper layer, only important information is redundantly encoded according to its importance, and thus, error robustness can be improved. For example, an upper layer of FGS is composed of bit planes. The bit planes become important information as they are nearer a most significant bit (MSB). Thus, as shown in FIG. 9, bit planes corresponding to the MSB are redundantly encoded, thereby improving error robustness.

In this case, since the base layer and the upper layer are composed of additional bitstreams, the upper layer may be composed of additional slices. Additional slices are composed of most significant bit planes of a macroblock corresponding to a region regarded as important in an image, and thus, redundant image encoding can be performed. The redundantly-encoded slices are marked in the slice header, and thus can be discriminated from general slices.

A method and apparatus for redundant image encoding and decoding according to the present invention can also be embodied on computer readable recording media. The computer readable recording media include all types of recording devices in which data that can be read by a computer system are stored, such as ROMs, RAMs, CD-ROMs, magnetic tapes, floppy discs, optical data storage units. Also, the computer readable recording media are distributed over a network-connected computer system and can be stored and executed by computer readable codes.

As described above, in a method and apparatus for redundant image encoding and decoding to improve error robustness according to the present invention, regions indicated by slices are overlapped on each other when an image is encoded in units of slices, and an overlapped portion is redundantly encoded such that robustness with errors can be achieved during transmission via a network.

In particular, since a user can adjust the position and amount of a region to be redundantly encoded, the regions are set to a region of interest (ROI), and thus, subjective picture quality of the region of interest (ROI) can be improved, and a bit number to be redundantly encoded is adjusted according to the degree of errors occurring in a network channel, and thus, an encoding efficiency can be, improved.

While this invention has been particularly shown and described with reference to preferred embodiments thereof, it will be understood by those skilled in the art that various changes in form and details may be made therein without departing from the spirit and scope of the invention as defined by the appended claims.

What is claimed is:

1. An apparatus for redundant image encoding, the apparatus comprising:

a slice modeling unit which divides image data of an image into a plurality of regions and determines which of the regions are to be redundantly encoded, and determines one of a plurality of structures for each of a plurality of slices to be used in encoding the regions of the image;

a slice allocation unit which allocates each region of the image to at least one of the slices according to the slice structures, wherein the slice allocation unit allocates each of the regions to be redundantly encoded to more than one of the slices;

a picture header encoding unit which encodes picture header information comprising information required to decode encoded slices of the image; and a slice encoding unit which encodes the allocated image regions into encoded slices according to the picture header information, wherein the slice encoding unit encodes the regions allocated to be redundantly encoded into more than one encoded slice; and wherein the slice structure corresponds to a shape of each of the plurality of slices.

2. The apparatus of claim 1, wherein the slice modeling unit determines that each slice structure comprises a series of macroblocks.

3. The apparatus of claim 1, wherein the slice modeling unit divides the image into at least one rectangular first region and a second region and determines the structures of the slices so that each of the first and second regions is included in at least one independent slice.

4. The apparatus of claim 1, wherein the slice modeling unit determines that each slice structure comprises a set of macroblocks at certain positions of the image.

5. The apparatus of claim 1, wherein the slice modeling unit determines the structures of the slices in which the image data will be encoded to be identical structures.

6. The apparatus of claim 1, wherein the slice modeling unit determines the structures of the slices in which the image data will be encoded to be non-identical structures.

7. The apparatus of claim 1, wherein the slice modeling unit determines the regions to be redundantly encoded based on regions predetermined by a user as being important regions from the image.

8. The apparatus of claim 1, wherein the slice modeling unit determines the regions to be redundantly encoded by detecting regions where motions are actively performed, from the image.

9. The apparatus of claim 1, wherein the slice modeling unit determines an amount of the regions to be redundantly encoded according to an error rate and a transmission bandwidth which occur in a transmission environment of the encoded slices, and an encoding efficiency of the slice encoding unit.

10. The apparatus of claim 1, wherein the slice modeling unit comprises:
 a slice structure modeling portion which determines the structures of the plurality of slices to be used for image encoding; and
 a redundant encoding modeling portion which determines positions and amount of the regions to be redundantly encoded from the image using the plurality of slices.

11. The apparatus of claim 1, wherein the slice allocation unit determines sizes of the plurality of slices according to an amount of the regions to be redundantly encoded.

12. The apparatus of claim 1, wherein the slice allocation unit allocates the image data to the plurality of slices so that each of the slices includes image data of the regions to be redundantly encoded and image data of regions not to be redundantly encoded.

13. The apparatus of claim 1, wherein the slice allocation unit allocates the image data to the plurality of slices so that at least one slice includes image data of only a region to be redundantly encoded.

14. The apparatus of claim 1, wherein the picture header encoding unit encodes the picture header information containing structure, position, and size of each slice.

15. The apparatus of claim 1, wherein the slice encoding unit comprises:
 a slice header encoding portion which generates for each of the slices a slice header comprising information used to encode macroblocks of the slice according to the picture header information;
 a temporal/spatial predictive encoding portion which temporal/spatial predictively encodes the allocated image regions into the encoded slices of the image;
 a transform quantization portion which transforms the temporal/spatial predictively-encoded slices into a frequency domain and quantizes data of the transformed slices; and
 an entropy-encoding portion which entropy-encodes the quantized data.

16. The apparatus of claim 15, wherein the slice header includes flag information which indicates whether the slice to be encoded includes only regions to be redundantly encoded.

17. The apparatus of claim 1, wherein the slice encoding unit quantizes each of the redundantly-encoded slices at different quantization intervals.

18. The apparatus of claim 1, wherein the slice encoding unit encodes only main information containing a macroblock header and a motion vector of the regions to be redundantly encoded in a first slice and encodes all information of the regions to be redundantly encoded in a second slice among two slices including the image data of the region to be redundantly encoded.

19. The apparatus of claim 1, wherein the slice encoding unit encodes only main information containing a macroblock header, a motion vector, and a discrete cosine (DC) coefficient contained in a discrete cosine transform (DCT) coefficient of the regions to be redundantly encoded in a first slice and encodes all information of the regions to be redundantly encoded in a second slice among two slices including the image data of the regions to be redundantly encoded.

20. An apparatus for redundant image decoding, the apparatus comprising:
 a picture header decoding unit which decodes picture header information comprising information required to decode encoded slices of an image divided into a plurality of regions, wherein at least one of the encoded image slices corresponds to each region of the image, and wherein a plurality of the encoded image slices corresponds to a redundantly encoded region of the image;
 a slice construction unit which determines structures and positions of the encoded image slices to be decoded according to the decoded picture header information;
 a slice decoding unit which decodes the encoded image slices according to the decoded picture header information; and
 an image construction unit which disposes image data of each decoded slice according to the determined structure and position of the slices and restores and outputs a decoded image;
 wherein, when the decoded picture header information for an encoded image slice indicates that the encoded image slice corresponds to redundantly-encoded regions of the image, the slice decoding unit decodes the encoded image slice that corresponds to the redundantly-encoded regions if errors occur in decoding another one of the plurality of encoded image slices that corresponds to the redundantly-encoded regions.

21. The apparatus of claim 20, wherein the slice decoding unit comprises:
 an entropy-decoding portion which entropy-decodes the encoded image slices according to the position and size information of the slices decoded from the picture header information;
 an inverse-transform quantization portion which performs inverse-quantization of the entropy-decoded image slices, performs inverse-transform of the inversely-quantized image data into a temporal domain, and generates temporal/spatial predictively-encoded image data; and
 an image restoration portion which restores the image by compensating the temporal/spatial predictively-encoded image data.

22. The apparatus of claim 21, wherein, when errors do not occur when decoding the plurality of encoded image slices that correspond to a redundantly-encoded region, the image construction unit constructs the decoded image using the image data decoded from one of the encoded image slices that corresponds to the redundantly-encoded region which was encoded with a smallest quantization interval.

23. The apparatus of claim 20, wherein, when errors occur in decoding an encoded image slice that corresponds to a redundantly-encoded region, the image construction unit constructs the decoded image using the image data decoded from another one of the plurality of encoded image slices that corresponds to the redundantly-encoded region.

24. A method for redundantly encoding an image, the method comprising:
(a) dividing image data of an image into a plurality of regions and determining which of the regions are to be redundantly encoded, and determining one of a plurality of structures for each of a plurality of slices to be used in encoding the regions of the image;
(b) allocating each region of the image to at least one of the slices according to the slice structures, wherein each of the regions to be redundantly encoded is allocated to more than one of the slices; (c) encoding picture header information comprising information required to decode encoded slices of the image; and
(d) encoding the allocated image regions into encoded slices according to the picture header information, wherein the regions allocated to be redundantly encoded are encoded into more than one encoded slice; and
wherein the slice structure corresponds to a shape of each of the plurality of slices.

25. The method of claim 24, wherein in (a), each slice structure comprises a series of macroblocks.

26. The method of claim 24, wherein in (a), the image is divided into at least one first rectangular region and a second region, and the structures of the slices are determined so that each of the first and second regions is included in at least one independent slice.

27. The method of claim 24, wherein in (a), each slice structure comprises a set of macroblocks at certain positions of the image.

28. The method of claim 24, wherein in (a), the structures of the slices in which the image data will be encoded are determined to be identical structures.

29. The method of claim 24, wherein in (a), the structures of the slices in which the image data will be encoded are determined to be non-identical structures.

30. The method of claim 24, wherein in (a), regions, predetermined by a user as an important region from the image, are determined as the regions to be redundantly encoded.

31. The method of claim 24, wherein in (a), the regions to be redundantly encoded are determined by detecting regions where motions are actively performed, from the image.

32. The method of claim 24, wherein in (a), an amount of the regions to be redundantly encoded is determined according to an error rate and a transmission bandwidth which occur in a transmission environment of the encoded slices, and an encoding efficiency of an encoder for encoding the slices.

33. The method of claim 24, wherein (a) comprises:
determining the structures of the plurality of slices to be used for image encoding; and
determining positions and amount of the regions to be redundantly encoded from the image using the plurality of slices.

34. The method of claim 24, wherein in (b), sizes of the plurality of slices are determined according to an amount of the regions to be redundantly encoded.

35. The method of claim 24, wherein in (b), the image data are allocated to the slices so that each of the slices includes image data of the regions to be redundantly encoded and image data of regions not to be redundantly encoded.

36. The method of claim 24, wherein in (b), the image data are allocated to the slices so that at least one slice includes image data of only a region to be redundantly encoded.

37. The method of claim 24, wherein in (c), the picture header information containing structure, position, and size of each slice is encoded.

38. The method of claim 24, wherein (d) comprises:
generating for each of the slices a slice header comprising information used to encode macroblocks of the slice according to the picture header information;
temporal/spatial-predictively encoding the allocated image regions into the encoded slices of the image;
transforming the temporal/spatial predictively-encoded slices into a frequency domain and quantizing data of the transformed slices; and
entropy-encoding the quantized data.

39. The method of claim 38, wherein the slice header includes flag information which indicates whether the slice to be encoded includes only regions to be redundantly encoded.

40. The method of claim 24, wherein in (d), each of the redundantly-encoded slices are quantized at different quantization intervals.

41. The method of claim 24, wherein in (d), among two slices including the image data of the regions to be redundantly encoded, only main information containing a macroblock header and a motion vector of the regions to be redundantly encoded is encoded in a first slice, and all information of the regions to be redundantly encoded are encoded in a second slice.

42. The method of claim 24, wherein in (d), among two slices including the image data of the regions to be redundantly encoded, only main information containing a macroblock header, a motion vector, and a discrete cosine (DC) coefficient contained in a discrete cosine transform (DCT) coefficient of the regions to be redundantly encoded is encoded in a first slice, and all information of the regions to be redundantly encoded are encoded in a second slice.

43. A computer readable medium encoded with a computer program comprising computer-executable instructions for executing the method for redundant image encoding of claim 24.

44. A method for redundant image decoding, the method comprising:
(a) decoding picture header information including information required to decode encoded slices of an image divided into a plurality of regions, wherein at least one of the encoded image slices corresponds to each region of the image, and wherein a plurality of the encoded image slices corresponds to a redundantly encoded region of the image;
(b) determining structures and positions of the encoded image slices to be decoded according to the decoded picture header information;
(c) decoding the encoded image slices according to the decoded picture header information; and
(d) disposing image data of each decoded slice according to the structure and position of the slices determined in (b) and restoring and outputting a decoded image; and
when the decoded picture header information for an encoded image slice indicates that the encoded image slice corresponds to redundantly-encoded regions of the image, the encoded image slice that corresponds to the redundantly-encoded regions is decoded if errors occur in decoding another one of the plurality of encoded image slices that corresponds to the redundantly-encoded regions.

45. The method of claim 44, wherein (c) comprises:
entropy-decoding the encoded image slices according to the position and size information of the slices decoded from the picture header information;

performing inverse-quantization of the entropy-decoded image slices, performing inverse-transform of the inversely-quantized image data into a temporal domain, and generating temporal/spatial predictively-encoded image data; and restoring the image by compensating the temporal/spatial predictively-encoded image data.

46. The method of claim 44, wherein in (d), when errors occur in decoding an encoded image slice that corresponds to a redundantly-encoded region, the image is restored using the image data decoded from another one of the plurality of encoded image slices that corresponds to redundantly-encoded region.

47. The method of claim 44, wherein in (d), when errors do not occur when decoding the plurality of encoded image slices that correspond to a redundantly-encoded region, the image is restored using the image data decoded from one of the encoded image slices that corresponds to the redundantly-encoded region which was encoded with a smallest quantization interval.

48. A computer readable medium encoded with a computer program comprising computer-executable instructions for executing the method for redundant image decoding of claim 44.

* * * * *